(12) United States Patent
Le

(10) Patent No.: US 7,785,176 B1
(45) Date of Patent: Aug. 31, 2010

(54) PORTABLE MANUAL OYSTER OPENER AND METHOD

(76) Inventor: Chi-Minh Le, P.O. Box 842, Westwego, LA (US) 70094

( * ) Notice: Subject to any disclaimer, the term of this patent is extended or adjusted under 35 U.S.C. 154(b) by 0 days.

(21) Appl. No.: 12/372,757

(22) Filed: Feb. 18, 2009

Related U.S. Application Data

(60) Provisional application No. 61/029,527, filed on Feb. 18, 2008.

(51) Int. Cl.
*A22C 29/04* (2006.01)
(52) U.S. Cl. .................................................... 452/16
(58) Field of Classification Search ............. 452/12–17
See application file for complete search history.

(56) References Cited

U.S. PATENT DOCUMENTS 2,052,231 A * 8/1936 Kanzler ...................... 452/16
2,473,609 A * 6/1949 Plock ......................... 452/16
6,244,948 B1 * 6/2001 LiRosi ........................ 452/16

* cited by examiner

*Primary Examiner*—Thomas Price
(74) *Attorney, Agent, or Firm*—Garvey, Smith, Nehrbass & North, L.L.C.; Brett A. North

(57) ABSTRACT

An apparatus which manually forces open shells during the downward stroke of a reciprocating plunger. Opening can occur through shearing of the two shell halves along their seam. The tip of the plunger can be a long inclined blade and wedge shaped. The apparatus may open all sizes of shells by applying a downward force on at least one of the shell halves. Alternatively, both shearing and sliding forces are applied. In one embodiment the shell is placed parallel to the angle of taper of the tip for opening. When the plunger comes down it exerts by frictional shearing force on the shell which causes the halves to slide off each other and open providing access to the inside.

10 Claims, 2 Drawing Sheets

PORTABLE MANUAL OYSTER OPENER AND METHOD

CROSS-REFERENCE TO RELATED APPLICATIONS

Priority of U.S. Provisional Patent Application Ser. No. 61/029,527, filed Feb. 18, 2008, incorporated herein by reference, is hereby claimed.

U.S. patent application Ser. No. 11/776,381, filed Jul. 11, 2007, is incorporated herein by reference.

U.S. patent application Ser. No. 11/186,017, filed Jul. 20, 2005, is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention generally relates to seafood peeling and opening for restaurant use. More particularly, the present invention relates to a more efficient method and apparatus for manually opening shells.

Manually opening shells, such as oyster shells, by hand requires much time and effort. It would be advantageous to provide a method and apparatus for more efficiently manually opening shells.

SUMMARY

In one embodiment a food service employee takes an order for a certain amount of oysters or other seafood from diners of a restaurant. The food service employee inputs the order for the kitchen to prepare. The kitchen prepares the certain amount of seafood onto a plate for the food service employee to take out to diners.

In one embodiment the method and apparatus manually opens two halves of oyster shells without using a hand hammer to break or crack open the shells.

In one embodiment the opening of oyster shells can be assisted by an operator of the apparatus, such as by aligning the shells to be opened under a reciprocating plunger and moving a bar operatively connected to the plunger downwards. In one embodiment the operator manually cuts out the oyster from the opened shell.

In one embodiment an individual holds an unopened oyster shell under the press while a plunger is moved down, the plunger contacts the shell, and the shell is opened by the downward movement of the bar.

In one embodiment the halves of the oyster shells are opened by shearing. In one embodiment the halves of the oyster shells are opened by chiseling.

In one embodiment the method and apparatus manually opens multiple oyster shells each minute. In one embodiment this process is repeated at least 12 times and then stopped.

In one embodiment, after the shell is opened, an individual cuts out the oyster from the opened half shells.

In one embodiment the apparatus is powered by the arm of an operator. In one embodiment the operator's arm controls the speed of the apparatus.

In one embodiment the apparatus includes a bar operably connected to a reciprocating plunger, and powered by the operator. In one embodiment the operable connection includes a gear. The bar can be operably connected to the gear which itself is operably connected to a plunger.

In one embodiment the bar is caused to reciprocate back and forth thereby causing the plunger to reciprocate up and down.

In one embodiment the apparatus is manually operated with force on the plunger and tip to contact and separate oyster shells into their component halves. This separation can be accomplished by shearing the two half shells apart from each other. Alternatively, this separation can be accomplished by chiseling the two half shells apart from each other through the seam between the two halves of the shells. Once the two half shells are separated (e.g., the oyster is opened) the interior of the oyster can be accessed and cut out with a cutting tools, such as a shucking knife.

One embodiment includes an apparatus used to manually force open shells during the downward force of a reciprocating plunger. Opening can occur through shearing of the two shell halves along their seam. The tip of the plunger can be a long inclined blade and wedge shaped. The apparatus may open all sizes of shells by applying a downward force on at least one of the shell halves. Alternatively, both shearing and sliding forces are applied. In one embodiment the shell is placed parallel to the angle of taper of the tip for opening. When the plunger comes down it exerts by frictional shearing force on the shell which causes the halves to slide off each other and open providing access to the inside.

In one embodiment the method and apparatus can be used to open and/or crack oyster shells, crab claws, lobster claws, clamshells, etc.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
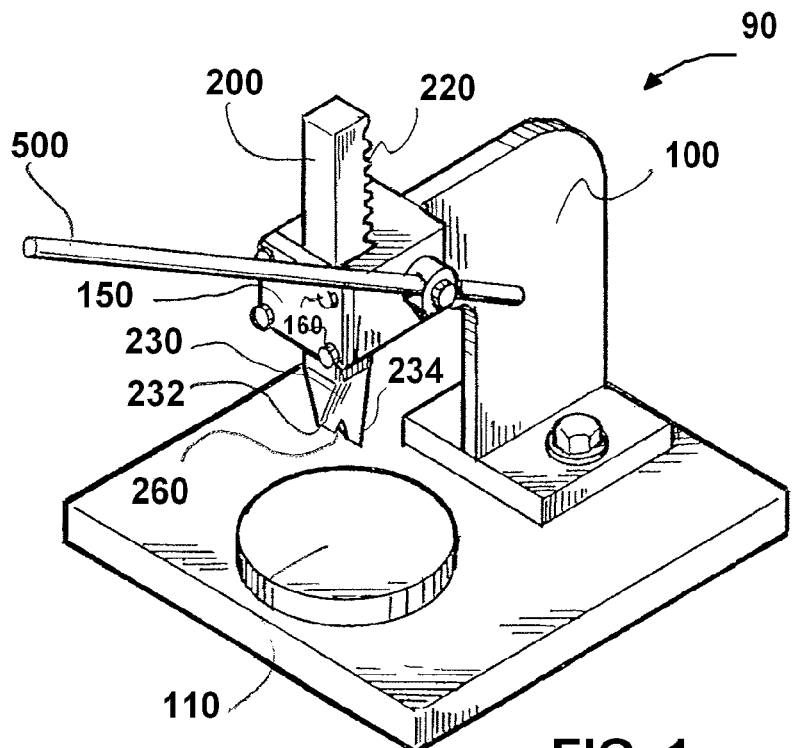
FIG. 1 is a perspective view of one embodiment of the apparatus which can be used for opening oyster shells.

FIG. 1 is a perspective view of one embodiment of the apparatus 90 which can be used for opening oyster shells 10. Generally, a plunger 200 reciprocates up and down (as schematically indicated by arrows 354). As will be explained below, an individual can place an unopened oyster shell 10 on base 110 and under plunger 200. When plunger 200 comes down it can shear on half of the shell away from the other half shell (along the seam) thereby opening the shell. Once opened the oyster can be removed from the shell (either by the operator or by another individual). The process can be repeated by placing another unopened oyster shell 10' on base 110 and under plunger 200. By repeating this process oyster shells can be easily opened (and the oyster removed from the shell)

without the increased effort required when using manual tools such as hammers and/or shucking knives.

Figure 2:
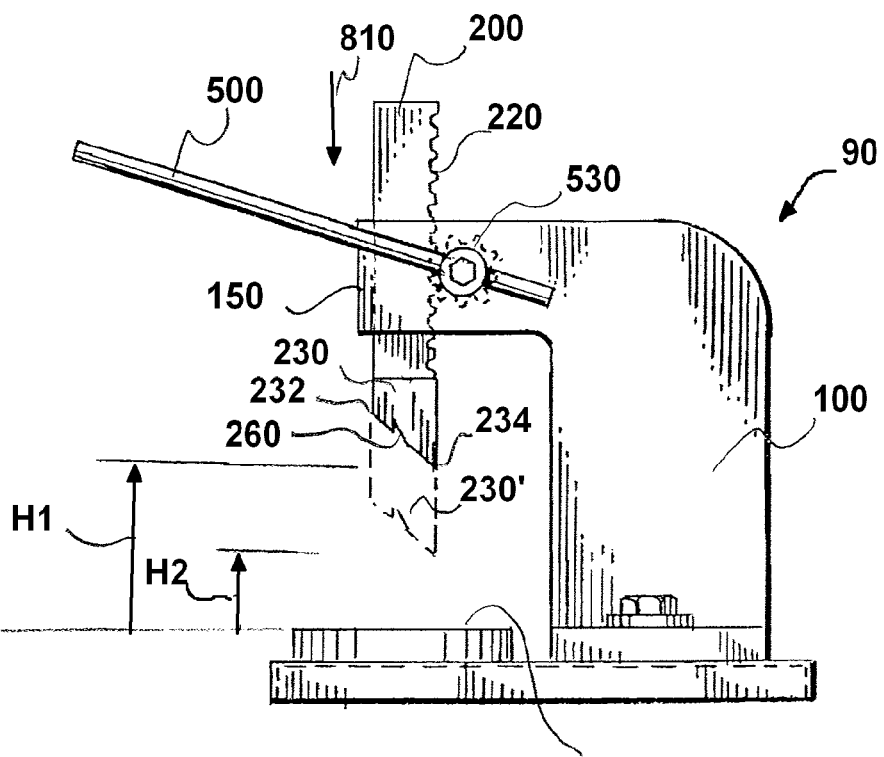
FIG. 2 is a side view schematically illustrating operation of the apparatus of FIG. 1.

FIG. 2 is a side view schematically illustrating operation of apparatus 90. Generally, apparatus 90 can include a reciprocating plunger 200 driven by an operator. The operator can drive the plunger 200 in press 100 by means of gear 530 and bar 500.

The apparatus is driven by bar 500 and gear 530. Bar 500 is rotationally connected to gear 530. Teeth 540 of gear 530 for a rack and pinion type connection with teeth 220 of plunger 200. Plunger 200 is slidably connected to press 100 through opening 140.

Operator manually moves bar 500 downwards causing an angular reciprocation of bar 500 (as schematically indicated by arrows 352). Preferably, bar 500 only reciprocates and does not make complete revolutions—angular reciprocation causes the linear reciprocation of plunger 200, whereas rotation would eject plunger from opening 140.

In FIG. 2 H1 and H2 indicate the upper and lower heights of plunger tip 230 relative to base 110. The difference between H1 and H2 is the amount of linear reciprocation of plunger 200. The amount of reciprocation is controllable by many factors such as the diameter of gear 530 (increasing the diameter increases the amount of reciprocation). Additionally, the larger the amount of angular reciprocation of bar 500 increases the amount of linear reciprocation of plunger 200. The length of bar 500 can be set up so that it is adjustable. H2 can be set at a desired level by removing plate 150 (through plurality of fasteners 160) and setting plunger 200 at the desired linear rotation—at a point when bar 500 is at its maximum extent of angular rotation.

Preferably, tip 230 has an upper 232 and lower point 234, where the upper point 232 is toward the front and higher than the lower point 234. Also preferably, tip 230 has a V-shape where it increases in width to its top 236. Also preferably, tip 230 will include at least one discontinuity such as notch 260. Notch 260 can resist sliding of tip relative to the oyster shell to be opened (during the downward plunging process).

Figure 3:
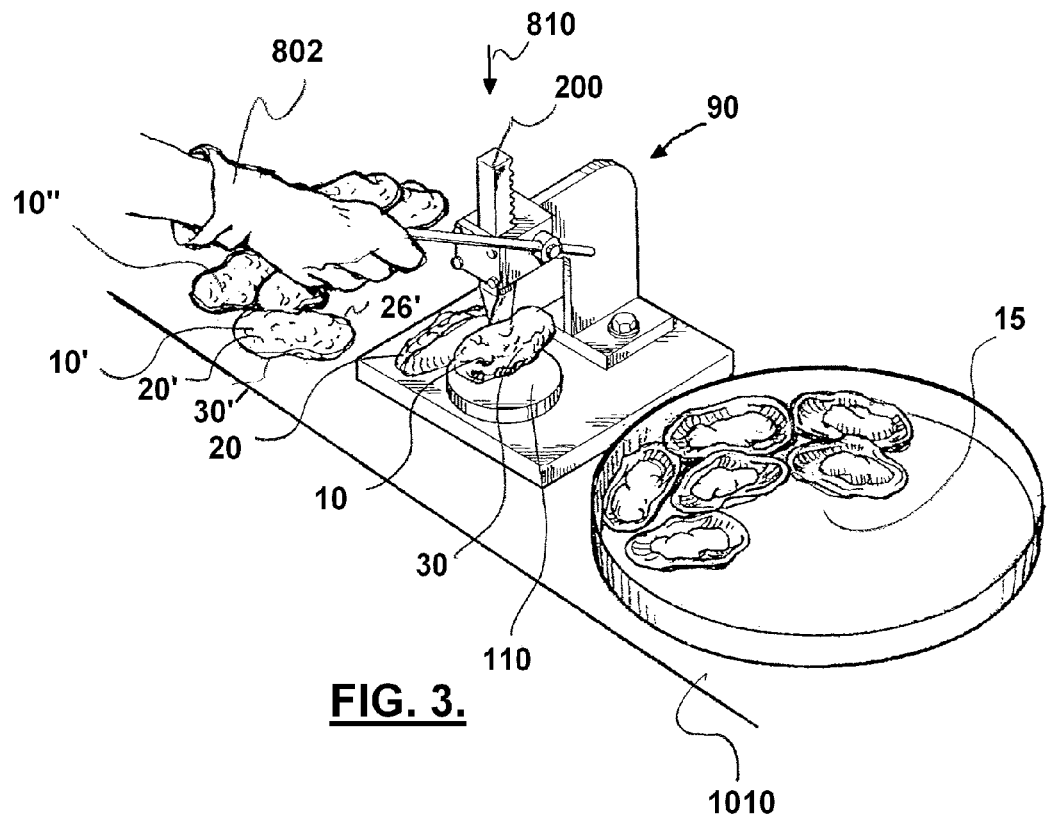
FIG. 3 is a perspective view of an individual holding a shell to be opened (where the hand of the person holding the shell has been removed for clarity).

Figures and 3 illustrate various steps in one embodiment of the method. FIGS. 2 and 3 schematically indicate the placement step for inserting shell 10 into apparatus 90. FIG. 3 is a front view of an individual using apparatus 90 to open a shell 10. The use of apparatus 90 can be done in full view of customers for which have ordered oysters to be shucked.

Shell 10 can be placed into apparatus 90 when plunger 200 is at the upper end of its linear reciprocation. Shell 10 can include shell halves 20 and 30 which halves are attached at seam 40, and can be roughly elliptical in shape. Shell 10 can be placed with the major axis of the ellipse roughly parallel to base 110 (as shown in FIG. 3). Additionally, shell 10 can be placed with its minor axis slightly skewed from the vertical as shown by FIG. 3 (such as by 15 degrees from the vertical). Placement of shell 10 slightly skewed allows tip 230 to contact one of the halves (e.g., 20) instead of the seam 26. In this way first half 20 will be sheared off of second half 30 thereby allowing easy access to the oyster inside of the shell 10.

After plunger 200 (and tip 230) completes their downward movement in the direction of arrow 810, plunger 200 will move up in the opposite direction of arrow 810 and another shell 10' can be placed under plunger 200 for opening. After opening the second shell 10', then another shell 10" can be placed under plunger 200 for opening. This process of shucking can be repeated until the operator 802 finishes opening shells 10 for a tray 15. However, during this process the manual opening of shells 10 is greatly facilitated by apparatus 90, thus preventing operator 810 from being fatigued. After an order of shucked oyster shells has been completed by apparatus 90 and operator 802, placed on tray 15, tray 15 can be brought to customer 950 by waiter 900.

It is believed that shearing the shell 10 halves works better than attempting to chisel open the shell halves at seam 26. This is because tip 230 will tend to crack portions of shell halves at seam during the chiseling process and such pieces can get into the oyster.

Figure 4:
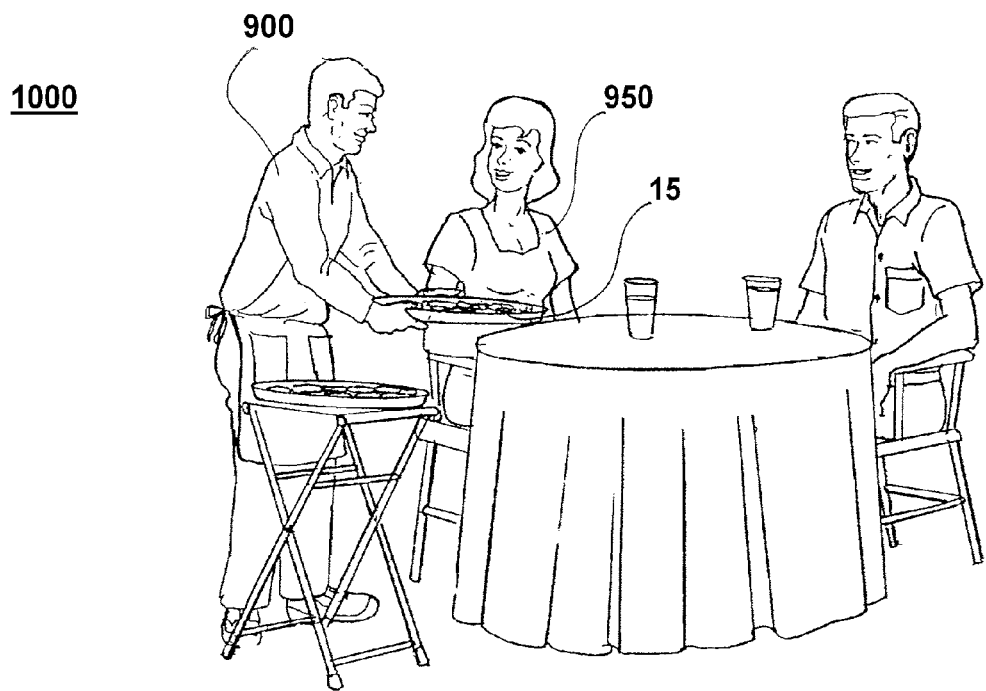
FIG. 4 is perspective view of a food service employee serving a tray of shucked oysters.

FIG. 4 shows the method of a restaurant 1000 serving oysters or other seafood. Where a food service employee 900 takes the order. Where the order is taken in a restaurant 1000. Where the oyster machine 90 can be viewed by restaurant customers during the shucking process, such as on oyster bar 1010. Where the food service employee 900 delivers the shucked oysters on tray 15 to the restaurant customers 950.

Apparatus 90 has the ability to open multiple shells in a minute. The apparatus' 90 output capacity depends on the strength and agility of the operator 802.

The following is a list of parts and materials suitable for use in the present invention.

PARTS LIST

| Part Number | Description |
|---|---|
| 10 | shell |
| 15 | tray for shucked oysters |
| 20 | first half |
| 22 | outer surface |
| 26 | seam |
| 28 | meat |
| 30 | second half |
| 40 | seam |
| 50 | oyster |
| 90 | apparatus |
| 100 | press (such as Harbor Freight Tool one ton press) |
| 110 | base |
| 140 | opening |
| 150 | plate |
| 160 | plurality of fasteners |
| 200 | plunger |
| 220 | teeth |
| 230 | tip or splitter section |
| 232 | front |
| 234 | rear |
| 236 | top |
| 240 | first end |
| 250 | second end |
| 260 | notch |
| 270 | enlarged section |
| 280 | fasteners |
| 290 | base |
| 292 | bore |
| 294 | fastener |
| 352 | arrow |
| 354 | arrow |
| 500 | bar |
| 530 | gear |
| 540 | teeth |
| 800 | step of positioning oyster |
| 802 | hand |
| 810 | arrow |
| 820 | arrow |
| 830 | step of separating two halves of oyster shell (e.g., by shearing or by chiseling) |
| 840 | step of removing oyster meat from shell |
| 900 | waiter |
| 950 | customer |
| 1000 | restaurant |
| 1010 | oyster bar |

All measurements disclosed herein are at standard temperature and pressure, at sea level on Earth, unless indicated

The invention claimed is:

1. A apparatus for manually opening shells comprising:
   (a) a reciprocating plunger, the reciprocating plunger including a tip for opening shells;
   (b) a manual bar being operatively connected to the plunger and turning at least one gear, wherein the movement of the plunger is vertical; and
   (c) a base located under the reciprocating plunger, wherein the plunger includes a tip, and the tip includes a front and rear areas and the front is elevated relative to the rear, and between the front and the rear is a notch.

2. The apparatus of claim 1, wherein the tip includes a bottom and a top, and the tip widens from the bottom to the top.

3. The apparatus of claim 2, wherein the tip is a V-shape.

4. The apparatus of claim 1, wherein the plunger is operably connected to a rack and pinion system which is operably connected to the bar.

5. A method of manually opening shells comprising the steps of:
   (a) a food service employee takes an order for a certain amount of oysters or other shellfish from diners;
   (b) food service employee inputs order for oyster order preparation;
   (c) placing a shell having two halves in an apparatus for manually opening shells, the apparatus having a reciprocating plunger, the reciprocating plunger including a tip for opening shells, the reciprocating plunger being operatively connected to a bar, and a base located under the reciprocating plunger, wherein the plunger includes a tip, and the tip includes a front and rear areas and the front is elevated relative to the rear, and between the front and the rear is a notch;
   (d) manually causing the plunger to contact the shell and opening the shell by shearing;
   (e) repeating steps "c" and "d" for a second, third, and more shells until the order is filled; and
   (f) delivering the shucked oysters to the diners.

6. The method of claim 5, wherein the apparatus has a base located under the reciprocating plunger, and the base is rotatable relative to the plunger.

7. The method of claim 5, wherein the apparatus further comprises a second reciprocating plunger including a second tip for opening shells, the second reciprocating plunger being operatively connected to the bar, and a second base located under the second reciprocating plunger, the second base being rotatable relative to the second plunger.

8. The method of claim 5, where a dozen shells are opened.

9. The method of claim 5, where two dozen shells are opened.

10. The method of claim 5, where 12 dozen shells are opened.

* * * * *